(12) United States Patent
Schneider (10) Patent No.: US 10,290,168 B2
(45) Date of Patent: May 14, 2019

(54) METHOD AND DEVICE FOR DETERMINING THE FILL LEVEL OF COIN TUBES

(71) Applicant: Crane Payment Innovations GmbH, Buxtehude (DE)

(72) Inventor: Thorsten Schneider, Apensen (DE)

(73) Assignee: Crane Payment Innovations GmbH, Buxtehude (DE)

( * ) Notice: Subject to any disclaimer, the term of this patent is extended or adjusted under 35 U.S.C. 154(b) by 0 days.

(21) Appl. No.: 15/564,948

(22) PCT Filed: Apr. 6, 2016

(86) PCT No.: PCT/EP2016/057522
§ 371 (c)(1),
(2) Date: Oct. 6, 2017

(87) PCT Pub. No.: WO2016/162378
PCT Pub. Date: Oct. 13, 2016

(65) Prior Publication Data
US 2018/0130277 A1    May 10, 2018

(30) Foreign Application Priority Data

Apr. 8, 2015 (DE) .................. 10 2015 105 286

(51) Int. Cl.
*G07D 11/00* (2006.01)
*G07D 9/00* (2006.01)
*G07D 5/02* (2006.01)
*G06T 7/62* (2017.01)

(52) U.S. Cl.
CPC .............. *G07D 9/002* (2013.01); *G06T 7/62* (2017.01); *G07D 5/02* (2013.01); *G07D 11/0045* (2013.01)

(58) Field of Classification Search
CPC ........ G07D 9/00; G07D 11/0045; G07D 9/06; G07D 5/02; G07D 9/002; G07D 11/0036; G07D 9/065; A61B 6/022; G06T 7/507; G06T 7/50; G06T 7/593; G06T 2207/20228; G06T 7/60; G06T 7/62; G06T 7/64; G06T 7/66; G06T 7/68; G06T 3/005; G06K 2209/40; H04N 13/026
USPC ........ 453/16, 17, 61, 62; 382/136, 154, 190, 382/199, 201, 203, 204, 285, 286, 287; 194/206, 207, 328–332, 334, 335
See application file for complete search history.

(56) References Cited

U.S. PATENT DOCUMENTS

| 6,425,817 | B1 | 7/2002 | Momemy |
| 6,626,750 | B2 | 9/2003 | Momemy |
| 7,481,702 | B2 | 1/2009 | Bell et al. |
| 9,102,055 | B1 * | 8/2015 | Konolige .............. B25J 9/163 |

(Continued)

FOREIGN PATENT DOCUMENTS

| DE | 8810880 U1 | 11/1988 |
| WO | 2004104946 A1 | 12/2004 |

*Primary Examiner* — Jeffrey A Shapiro (57) ABSTRACT

A method for determining the fill level of at least one coin tube comprises capturing at least one spatially resolved image of an upper side of the at least one coin tube using a spatially resolving optical sensor disposed at a defined distance above the at least one coin tube. Transmitting the at least one spatially resolved image to an evaluation unit configured to evaluate the at least one spatially resolved image using image processing to determine a fill level of the at least one coin tube.

19 Claims, 3 Drawing Sheets

(56) References Cited

U.S. PATENT DOCUMENTS

| | | | |
|---|---|---|---|
| 2004/0231955 A1* | 11/2004 | Carter | G07D 9/00 |
| | | | 194/217 |
| 2005/0118941 A1 | 6/2005 | Navis | |
| 2007/0072534 A1 | 3/2007 | Levasseur et al. | |
| 2008/0065291 A1* | 3/2008 | Breed | B60N 2/002 |
| | | | 701/36 |
| 2009/0022390 A1* | 1/2009 | Yacoubian | G07D 7/121 |
| | | | 382/135 |
| 2014/0200071 A1 | 7/2014 | Czyzewski et al. | |
| 2017/0199122 A1* | 7/2017 | Robitaille | G01N 21/51 |

\* cited by examiner

METHOD AND DEVICE FOR DETERMINING THE FILL LEVEL OF COIN TUBES

CROSS REFERENCE TO RELATED APPLICATION

This application is a national stage application pursuant to 35 U.S.C. § 371 of International Application No. PCT/EP2016/057522, filed Apr. 6, 2016, which claims priority to German Patent Application No. 10 2015 105 286.5, filed Apr. 8, 2015, the entire contents of each application being herein incorporated by reference.

BACKGROUND OF THE INVENTION

The present invention is related to devices and methods for determining the fill level of at least one coin tube that can be filled with coins. Moreover, the invention is related to a coin storage device for storing and/or paying out coins.

Moneychangers, for instance, have normally so-called coin tubes, in which coins stored in the moneychanger and to be paid out by the moneychanger are stored to be stacked atop of each other. One separate coin tube is provided for each type of coin. Thus, there is the necessity to determine the number of coins in the coin tubes, that is to say the fill level of the coin tubes, during the operation. It is known to achieve this by providing one or several light barriers, which are interrupted by the coin stack when one or several limit heights in the coin tubes are exceeded. It is disadvantageous in this kind of fill level determination that only discrete values of the fill level can be determined. In case that the coin stack is between two light barriers in its height, the coins between the light barriers are not included. Thus, this technology does not always offer sufficient accuracy in practice.

Moreover, the utilization of sound- or ultrasound sensors is known for the indicated purpose, which measure the elapsed time of an ultrasound signal from a sender to the uppermost coin of a coin stack and back from there to a receiver. By means of this measurement of the elapsed time, the distance between the ultrasound sensor or receiver and the uppermost coin is calculated, from which—with known coin thickness—the height of the coin stack and thus the number of coins which are in the coin tube can be inferred in turn. Disadvantageous in this technology is the strong dependence of the sound velocity, and therefore of the measurement result, from the prevailing temperature and humidity. In addition, such ultrasound sensors have a large blind range, in which no reliable measurement is possible due to an overlap of the emitted and the reflected sound signals. This blind range is located near to the sound sender or sound receiver. A significant minimum distance between the sound senders or sound receivers and the uppermost coin of a coin stack is in practice necessary for a reliable measurement, for instance a distance of around 2 cm. In turn, this limits the capacity of the coin tubes when the installation space of the device is given.

Moreover, the utilization of image processing systems is known for identifying and counting tokens used for instance in gambling casinos. Insofar, examples here are U.S. Pat. No. 6,425,817 B1, U.S. Pat. No. 6,626,750 B2, U.S. Pat. No. 7,481,702 B2 or US 2014/0200071 A1. Some of these documents describe imaging methods in which a lateral view of a stack of tokens is captured. Based on this principle, an image processing software identifies different tokens located in the stack and determines an overall value of the stack, for instance of a gambler of a gambling casino. The described methods require a lateral access of the image sensors to the tokens that are to be evaluated. Such a lateral access is not always given in practice. Moreover, the described image evaluation systems are complex and not always reliable for this reason.

BRIEF SUMMARY OF THE INVENTION

Starting from the explained state of the art, the present invention is based on the goal to provide devices, methods and a coin storage device of the kind mentioned in the beginning, using which an accurate and reliable determination of the fill level of coin tubes is possible with maximum filling capacity of the coin tubes.

According to the first aspect, the present invention achieves the goal by a method mentioned in the beginning, the method comprising capturing at least one spatially resolved image of the upper side of the at least one coin tube using a spatially resolving optical sensor arranged at a defined distance above the at least one coin tube and directed onto the upper side of the at least one coin tube. Transmitting the at least one spatially resolved image to an evaluation unit. Evaluating the at least one spatially resolved image by the evaluation unit by means of image processing, wherein the diameter of the uppermost coin filled into the coin tube is detected in the spatially resolved image. The fill level of the at least one coin tube is determined from the ratio between the inner or outer diameter of the at least one coin tube on the spatially resolved image and the detected diameter of the uppermost coin filled into the coin tube.

Furthermore, the invention achieves the goal according to the first aspect by a device comprising at least one spatially resolving optical sensor arranged at a defined distance above the at least one coin tube and directed onto the upper side of the at least one coin tube for capturing at least one spatially resolved image of the upper side of the at least one coin tube. An evaluation unit, wherein the at least one spatially resolving optical sensor is connected to the evaluation unit for transmitting the at least one spatially resolved image. The evaluation unit is adapted to evaluate the at least one spatially resolved image to detect the diameter of the uppermost coin filled into the coin tube in the spatially resolved image. The evaluation unit is adapted to determine the fill level of the at least one coin tube from the ratio between the inner or outer diameter of the at least one coin tube on the spatially resolved image and the detected diameter of the uppermost coin filled into the coin tube.

The at least one coin tube may be (circular-) cylindrical in particular. It is open at the topside, and the coin tubes are filled into the coin tube being stacked atop each other. At least one optical sensor looks into the coin tube from the topside, in particular vertically from the topside in the axial direction of the coin tube. It records, in particular the coins that are present in the coin tube. In addition, it can also record the normally circular opening of the coin tube. Spatially resolved images captured by the optical sensor are sent to the evaluation unit. By means of per se known image evaluation algorithms, the latter identifies the outer limits of the uppermost coin, which differs from the coin tube in particular with respect to colour or contrast, and then (also by means of per se known image evaluation algorithms) it determines the diameter of the visible uppermost coin in the spatially resolved image. Thus, the real diameter of the coin is not determined. This is anyway known, because only one type of coins is normally filled into each coin tube. The evaluation unit records the diameter of the uppermost coin like it appears in the spatially resolved image. This diameter depends on the distance of the coin to the optical sensor. The more the coin is remote, the smaller it appears, and therefore also its diameter in the captured spatially resolved image.

The diameter of the uppermost coin in the spatially resolved image determined in this way is considered in relation to the inner or outer diameter of the coin tube, as if it appears in the spatially resolved image. The inner diameter is the diameter of the opening of the coin tube. The outer diameter is the diameter of the outer wall of the coin tube. As the defined distance of the sensor to the upper side of the coin tube does not change, the inner or outer diameter of the coin tube in the spatially resolved image remains always the same. Therefore, the observed diameter proportion changes when the distance between the optical sensor and the uppermost coin changes.

In particular from the ratio between the inner or outer diameter of the at least one coin tube in the spatially resolved image on the one hand, and the determined diameter of the uppermost coin filled into the coin tube on the other hand, the evaluation unit determines the distance of the at least one spatially resolving sensor from the uppermost coin filled into the coin tube, and from this, taking into account the known thickness of the coins filled into the measured coin tube, it derives the fill level of the at least one coin tube.

Thus, the invention offers fill level recognition by a simple and reliable evaluation technique, without the necessity of any lateral optical access and which is not depending on outer influences like temperature, humidity or reflectivity of the coins and the ambient light. A relevant blind range like with ultrasound sensors does also not exist, so that the filling capacity of the coin tubes can be maximized. A high accuracy of the fill level recognition is possible if the resolution of the image sensors is sufficiently high. By doing so, it is made sure that every coin in the examined coin tube is taken into account in the fill level determination.

The at least one spatially resolving sensor used according to the invention may e.g., be a spatially resolving camera. It may be a spatially resolving CCD sensor or a spatially resolving CMOS sensor in particular. These devices yield high resolution and are compact and cost-saving at the same time.

As far as is spoken in the present application of coins or coin tubes, respectively, this comprises (metal) coins used in normal payment transactions as well as collector coins and tokens used in the gaming field in slot machines and in casinos, tokens of metal or plastics in particular.

The at least one spatially resolving sensor and the evaluation unit may be separate components, wherein the at least one spatially resolving sensor is connected to the evaluation unit by a suitable line or so on. Nevertheless, it is also possible that the at least one spatially resolving sensor and the evaluation unit are integrated in one common component part, in which the connection of the at least one spatially resolving sensor to the evaluation unit is then also realized. The evaluation unit integrated into this common component part can then output the determined distance to the uppermost coin or the fill level directly, e.g., to a further evaluation unit.

According to an embodiment, it may be provided that the evaluation unit determines the fill level of the at least one coin tube based on the distance of the at least one spatially resolving optical sensor from the uppermost coin filled into the coin tube. The distance of the at least one spatially resolving optical sensor from the uppermost coin filled into the coin tube is determined taking into account the defined distance of the at least one spatially resolving optical sensor to the topside of the at least one coin tube, in particular according to the equation:

$$a = \frac{A \cdot D}{d}$$

wherein:
a: distance of the at least one spatially resolving optical sensor from the uppermost coin filled into the coin tube;
A: distance of the at least one spatially resolving optical sensor from the topside of the at least one coin tube;
d: diameter of the uppermost coin filled into the coin tube in the spatially resolved image; and
D: inner or outer diameter of the at least one coin tube in the spatially resolved image.

This embodiment offers a particularly simple mathematical determination of the distance between the at least one optical sensor and the uppermost coin, and based on this, the determination of the fill level of the respective coin tube, taking into account the known thickness of the coins in the coin tube.

According to a further embodiment, it may be provided that the defined distance of the at least one spatially resolving optical sensor from the upper side of the at least one coin tube and/or the inner or outer diameter of the at least one coin tube in the spatially resolved image is stored in a memory of the evaluation unit, and that the evaluation unit uses the distance stored in the memory and/or the inner or outer diameter stored in the memory in the determination of the fill level of the at least one coin tube. Because the mentioned two values do not change at different fill levels of the coin tube, it is not necessary to determine them by measurement in every measurement process. Instead, these values can be determined once, for instance in the context of a calibration, and be stored in a memory for the evaluation unit and read out from the memory in each measurement process for the determination of the fill level. This simplifies the evaluation according to the invention even more.

It is also conceivable that the at least one spatially resolved image captured by the at least one spatially resolving optical sensor comprises the inner or outer diameter of the coin tube and that the evaluation unit determines the inner or outer diameter of the at least one coin tube in the spatially resolved image, which was used in the determination of the fill level of the at least one coin tube via image processing of the at least one spatially resolved image too.

With increasing distance of the optical sensor from the uppermost coin, i.e., at decreasing fill level, the determined diameter of the uppermost coin in the spatially resolved image becomes smaller and smaller. This can lead to problems, e.g., at distances of 10 cm and more if the resolution of the used image sensors is not sufficient. Therefore, in particular for high coin tubes with large coin capacity, high-resolution image sensors must be used. Alternatively or in addition, a fish eye lens can be mounted in front of the at least one spatially resolving sensor. Fish eye lenses enlarge the central region of the captured image compared to the outer regions of the image. Sufficiently large diameters of the uppermost coin appearing in the image can be generated even at larger distances from the uppermost coin through this measure. But on the other hand, the distance determination becomes more difficult through this.

The fill level of a plurality of coin tubes can be determined by the method or the device, respectively, of the present invention. The different coin tubes are then usually filled with different coins, just one type of coin being associated to each coin tube for filling. The measurement and evaluation exemplified above for at least one coin tube may then be performed for each of the coin tubes.

Further, it is possible that one own spatially resolving optical sensor, disposed in a defined distance above the respective coin tube and directed onto the upper side of the respective coin tube, is associated to each coin tube, wherein each of the spatially resolving optical sensors captures at least one spatially resolved image of the upper side of the respective coin tube, each of the spatially resolved images is transmitted to the evaluation unit, and the evaluation unit evaluates each of the spatially resolved images by means of image processing, wherein always the diameter of the uppermost coin filled into the respective coin tube is determined in the spatially resolved image, and wherein the fill level of the respective coin tube is determined from the ratio between the inner or outer diameter of the respective coin tube in the spatially resolved image and the respective detected diameter of the uppermost coin filled into the coin tube. However, this above-mentioned embodiment necessitates a plurality of optical sensors. This may be undesired for cost reasons not least.

Correspondingly, it is also possible that one common spatially resolving optical sensor, disposed in a defined distance above the respective coin tube and directed onto the upper side of the respective coin tube, is associated with several or all of the coin tubes, wherein the common spatially resolving optical sensor captures always at least one spatially resolved image of the upper side of the associated coin tube, each of the spatially resolved images is transmitted to the evaluation unit, and the evaluation unit evaluates each of the spatially resolved images by means of image processing, wherein always the diameter of the uppermost coin filled into the respective coin tube is determined in the spatially resolved image, and wherein the fill level of the respective coin tube is determined from the ratio between the inner or outer diameter of the respective coin tube in the spatially resolved image and the respective detected diameter of the uppermost coin filled into the coin tube.

According to a further embodiment, the common spatially resolving optical sensor, associated to the several or all of the coin tubes, can be always optically connected to the coin tubes via one fibre optic cable (40) at a time. By doing so, the common optical sensor can capture a spatially resolved image from each of the coin tubes in a particularly simple and reliable way. The endoscope principle is used in this. Each of the fibre optic cables, for instance one glass fibre at a time, is then placed above the respective coin tube such that the common optical sensor captures a spatially resolved image of each of the coin tubes. Fish eye lenses can be mounted in addition in front of the respective fibre optic cables like described above, in particular in the region above the respective coin tube.

It is possible that the common spatially resolving optical sensor, associated with the several or all of the coin tubes, captures the spatially resolved images of the upper sides of the associated coin tubes consecutively. Nevertheless, it is also possible that the common spatially resolving optical sensor, associated with the several or all of the coin tubes, captures the spatially resolved images of the upper sides of the associated coin tubes simultaneously, wherein the spatially resolved images are captured on different areas of the image sensor of the optical sensor. In an embodiment, the sensor surface of the optical sensor is subdivided into different areas, wherein for instance the fibre optic cables are directed towards the individual areas such that each area captures the spatially resolved image of exactly one of the coin tubes. The evaluation unit can separate these measurement signals from each other in the course of the evaluation, and discriminate the individual spatially resolved images in the overall measurement of the optical sensor and associate them to the individual coin tubes for fill level determination.

The device according to the present invention is particularly suitable and adapted for performing the method. This applies in particular to the at least one optical sensor and the evaluation unit. Correspondingly, the method of the present invent can be performed using the device of this invention.

According to an embodiment, the invention achieves the goal by a method for determining the fill level of at least one coin tube that can be filled with coins and which has one or several marks on its inner wall. The method comprises capturing at least one spatially resolved image of the upper side of the at least one coin tube with a spatially resolving optical sensor. The spatially resolving optical sensor is disposed at a defined distance above the at least one coin tube and directed towards the upper side of the at least one coin tube. Transmitting the at least one spatially resolved image to an evaluation unit. Evaluating the at least one spatially resolved image by the evaluation unit by means of image processing. One or several of the marks on the inner wall of the at least one coin tube which are not covered by coins filled into the coin tube are identified, and the fill level of the at least one coin tube is determined from this.

Moreover, according to another embodiment, the invention achieves the goal by a device for determining the fill level of at least one coin tube that can be filled with coins and, which has one or several marks on its inner wall. The device comprises at least one spatially resolving optical sensor arranged at a defined distance above the at least one coin tube and directed onto the upper side of the at least one coin tube for capturing at least one spatially resolved image of the upper side of the at least one coin tube. An evaluation unit, wherein the at least one spatially resolving optical sensor is connected to the evaluation unit for transmitting the at least one spatially resolved image. The evaluation unit is configured to evaluate the at least one spatially resolved image to identify one or several marks on the inner wall of the respective coin tube which are not covered by coins filled into the respective coin tube. The evaluation unit is configured to determine the fill level of the at least one coin tube from this.

The at least one coin tube can be realized like explained above with respect to the first aspect of the invention. Again, the at least one coin tube may be (circular-) cylindrical in particular. It is open at the topside, and the coin tubes are filled into the coin tube being stacked atop each other. Even the at least one optical sensor can be realized like explained above with respect to the first aspect of the invention. Again the at least one optical sensor looks into the coin tube from the topside, in particular vertically from the topside in the axial direction of the coin tube. It records, in particular, the coins present in the coin tube. In addition, it can also record the normally circular opening of the coin tube. Due to the perspective, the at least one optical sensor records, in addition, the inner wall of the at least one coin tube where it is not covered by coins that are present in the coin tube. Again, the spatially resolved images captured by the at least one optical sensor are sent to the evaluation unit.

The evaluation unit identifies the mark(s) that is/are visible in that area of the inner wall of the at least one coin tube which is not covered by coins and was captured by the at least one optical sensor, and by means of the identified one or several mark(s) it determines the height of the filling of the at least one coin tube by coins, and from this the fill level of the at least one coin tube taking into account the known thickness of the coins which were filled into the respective coin tube. The evaluation of the filling height, and thus of the fill level is further simplified in this second aspect of the invention. Through a covering of the inner wall by the optical mark(s) as continuous as possible, it can again be made sure that each coin filled into the coin tube is recorded. For the rest, the same advantages result like in the first aspect of the invention, i.e., in particular independence from outer influences, high reliability of the fill level determination in a simple way under avoidance of a relevant blind range.

At least one spatially resolving sensor can be a spatially resolving camera, a spatially resolving CCD sensor or a spatially resolving CMOS sensor in particular.

According to an embodiment, the marks may comprise several lines, spaced apart in the axial direction of the coin tube and extending vertically to the axial direction of the at least one coin tube on the inner wall of the at least one coin tube According to an alternative or additional embodiment, the optical mark may comprise at least one line which extends helically along the inner wall of the at least one coin tube.

Again, a fish eye lens can be mounted in front of the at least one spatially resolving sensor in order to increase the resolution.

Again, the fill level of a plurality of coin tubes can be determined by the method or respectively the device according to an aspect of the invention. It is then possible that one own spatially resolving optical sensor, disposed in a defined distance above the respective coin tube and directed onto the upper side of the respective coin tube is associated to each one of the coin tubes, wherein each of the spatially resolving optical sensors captures at least one spatially resolved image of the upper side of the respective coin tube. Each of the spatially resolved images is transmitted to the evaluation unit and is evaluated by the evaluation unit by means of image processing. One or several marks on the inner wall of the respective coin tube which are not covered by coins filled into the respective coin tube are identified, and the fill level of the at least one coin tube is determined from this.

Again, it is also possible however that one common spatially resolving optical sensor disposed in a defined distance above the respective coin tube and directed onto the upper side of the respective coin tube is associated to several or all of the coin tubes. The common spatially resolving optical sensor captures at least one spatially resolved image of the upper side of the associated coin tubes. Each of the spatially resolved images is transmitted to the evaluation unit and is evaluated by the evaluation unit by means of image processing. One or several marks on the inner wall of the respective coin tube which are not covered by coins filled into the respective coin tube are identified at a time and the fill level of the at least one coin tube is determined from this.

Further again, the common spatially resolving optical sensor, associated with the several or all of the coin tubes, can always be optically connected to the coin tubes via one fibre optic cable at a time. Again, fish eye lenses can be mounted additionally in front of the respective optical fibre cables, in the area above the respective coin tube in particular.

The common spatially resolving optical sensor, associated to the several or all of the coin tubes, may capture the spatially resolved images of the upper sides of the associated coin tubes simultaneously, wherein the spatially resolved images are captured on different areas of the image sensor of the optical sensor. Of course, again it is possible that the common spatially resolving optical sensor, associated to the several or all of the coin tubes, captures the spatially resolved images of the upper sides of the associated coin tubes consecutively.

The device according to the invention, in particular the at least one optical sensor or the evaluation unit, can be suited for performing the method according to the second aspect. Correspondingly, the method according to the second aspect of the invention can be performed by the device according to the second aspect of this invention. It is also possible to combine embodiments according to the first aspect of this invention and embodiments according to the second aspect of this invention.

Moreover, the present invention relates to a coin storage device for storing and/or paying out coins, comprising one or several coin tubes that can be filled with coins, and comprising a device according to the present invention. The coin storage device may be a moneychanger in particular, which is used in pay stations. It has a coin inlet, through which coins are supplied to a coin-testing device of the moneychanger. The genuineness and the type of the respective supplied coins are tested in the coin-testing device. Depending on the test result, the coins are then filled into the coin tubes provided for the respective coin type, or fed to an outlet if no genuineness was found. The coin tubes are normally located below the coin-testing device. The optical radiation senders and optical radiation receivers as well as the control and evaluation units according to the present invention may then be integrated into the coin-testing device.

According to a further embodiment, it may be provided that the testing device performs a payout of coins from the coin tubes by means of fill levels determined for the individual coin tubes in such a way that the fill levels in the coin tubes do not fall below a respective given minimum value. Thus, there will be an intelligent coin management due the measurement results of the sensor technology of this invention. By giving out certain coins, the coin changer can influence the fill levels of the individual coin tubes within certain limits, such that there will be enough coins of every coin type. If the number of coins in one of the coin tubes falls below the given minimum value, the coin changer can emit a warning signal.

BRIEF DESCRIPTION OF THE DRAWINGS

Examples of the realisation of the present invention will be explained in more detail by way of figures. They show schematically:

FIG. 1 a device of the present invention according to the first aspect of the invention in a sectional view, FIG. 2 in the left part, the view of FIG. 1 when the coin tube is maximally filled with coins, and in the right part a view of the image captured by the optical sensor of the device at the fill level shown in the left part, FIG. 3 in the left part, the view of FIG. 1 when the coin tube is minimally filled with coins, and in the right part a view of the image captured by the optical sensor of the device at the fill level shown in the left part, FIG. 4 a diagram for the illustration of the relationship between the diameter appearing in the spatially resolved image of the uppermost coin of a coin tube and the distance of the at least one optical sensor from the coin, FIG. 5 a spatially resolved image captured by the at least one optical sensor according to a an embodiment of the invention, FIG. 6 a spatially resolved image captured by the at least one optical sensor according to an embodiment of the invention, FIG. 7 a coin storage device according to the present invention for storing and/or paying out coins in a condition dismounted for the sake of illustration, in a partly transparent perspective view, and FIG. 8 a partial view of a further embodiment of a coin storage device according to the present invention.

DETAILED DESCRIPTION OF THE INVENTION

Figure 1:
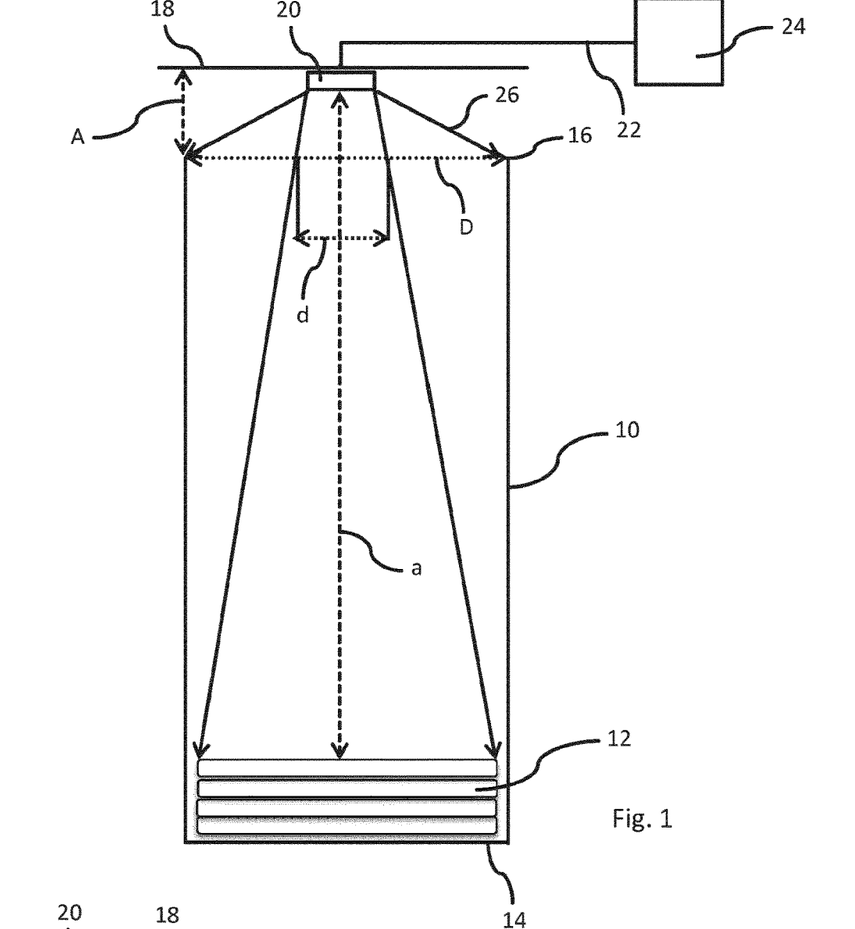

As far as not indicated otherwise, equal reference signs denote equal objects in the figures. In FIG. 1, a coin tube is shown at reference sign 10 which can be used for instance in a coin storage device for storing and/or paying out coins like shown in FIG. 7. In the coin tube 10 there are several, in the shown example four coins 12, in particular stacked on the bottom 14 of the coin tube 10. Above the open end 16 at the topside of the coin tube 10 there is a spatially resolving optical sensor 20 held on a holder plate 18, for instance a CCD sensor or a CMOS sensor. The optical sensor 20 is connected to an evaluation unit 24 via a line 22.

In the operation, the optical sensor 20 captures a spatially resolved image of the upper side of the coin tube 10, for instance triggered by the evaluation unit 24. By doing so, the optical sensor 20 records also the outer wall of the coin tube 10 and in particular the inner diameter D of the coin tube 10, like illustrated in FIG. 1 by the arrows 26. The optical sensor 20 is arranged in a defined distance A from the upper side of the coin tube 10. The optical sensor 20 has a distance a from the uppermost coin 12. The diameter of the uppermost coin 12 appears in the captured spatially resolved image with a largeness which depends on the distance a. This diameter of the uppermost coin 12 appearing in the spatially resolved image is indicated by d in FIG. 1.

Figure 2:
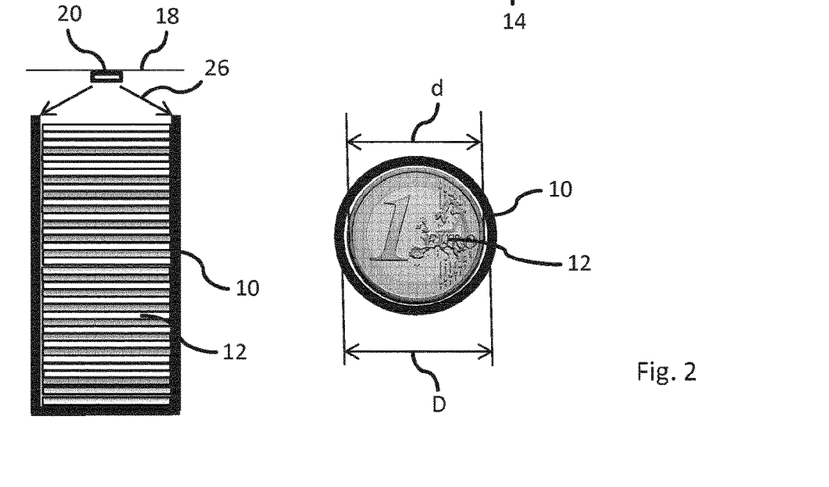
Figure 3:
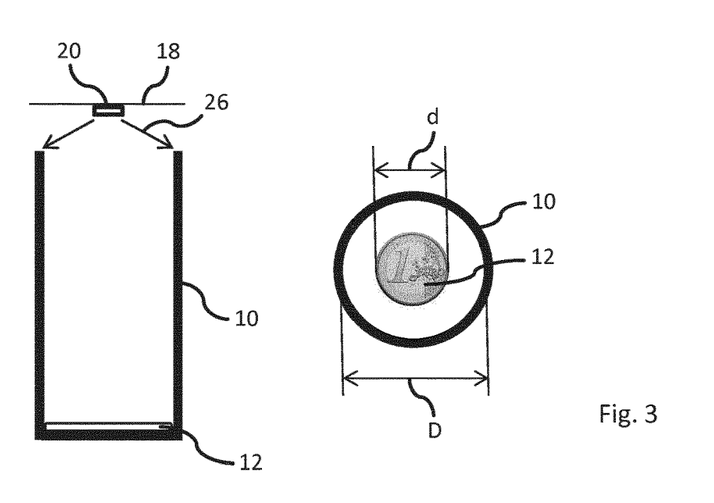

The device of FIG. 1 is shown at different fill levels of the coin tube 10 in the FIGS. 2 and 3, the evaluation unit 24 being not shown for reasons of visualization. A completely filled coin tube 10 is shown in FIG. 2, and in FIG. 3 a coin tube 10 which is filled with only one coin 12. In the right part of the FIGS. 2 and 3, the respective spatially resolved image captured by the optical sensor 20 is shown. The different largeness of the uppermost coin 12 appearing in the image, depending on the distance a, can be recognised easily.

Figure 4:
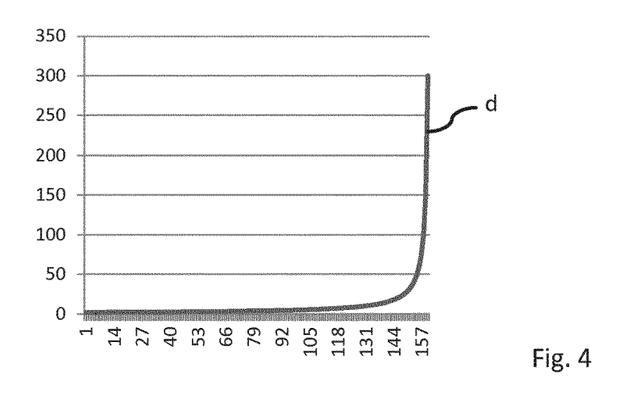

The relationship between the diameter d of the uppermost coin 12 appearing in the spatially resolved image and the distance a between the optical sensor 20 and the uppermost coin 12 is illustrated in FIG. 4. The diagram shows exemplary measurement values of the diameter d for a coin tube diameter of 30 mm and coin tube height of 160 mm. (160–a) is plotted on the abscissa of the diagram in FIG. 4. On the ordinate, (d) is plotted in mm. One can recognise that the diameter of the coin appearing in the image increases strongly with decreasing distance a.

The spatially resolved image captured by the optical sensor 20 of the device of this invention according to FIGS. 1 to 4 is transmitted to the evaluation unit 24 via the line 22. By means of per se known evaluation algorithms, the evaluation unit 24 determines the diameter d of the uppermost coin 12 filled into the coin tube 10, like it appears in the spatially resolved image. The defined distance A of the optical sensor 20 from the upper side 16 of the coin tube 10 is known and stored in a memory of the evaluation unit 24. It does not change when the fill level of the coin tube 10 changes. The same holds for the inner diameter D of the coin tube 10 used in this example. This value is also stored in a memory of the evaluation unit 24. From the two values A and D stored in the memory and the value d determined from the spatially resolved image, the evaluation unit 24 determines now the distance a of the optical sensor 20 form the uppermost coin 12 according to the equation:

$$a = \frac{A \cdot D}{d}$$

As the thickness of the coins 12 filled into the coin tube 10 is known, the evaluation unit 24 can determine the fill level of the coin tube 10 by coins directly from this.

Figure 5:
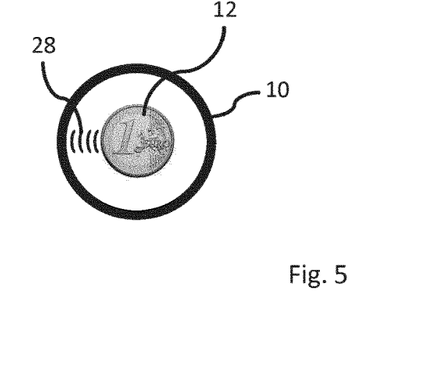

FIG. 5 shows a spatially resolved image captured by the optical sensor 20 according to the second aspect of the invention. In this realisation example, several lines 28 on the inner wall of the coin tube 10, spaced apart in the axial direction of the coin tube 10 and extending vertically to the axial direction of the coin tube 10, are provided as fill level markers. The optical sensor 20 which can be realised like explained with respect to FIG. 1 above, captures the not covered part of the inner wall of the coin tube 10 which depends on the fill level of the coin tube 10 with coins 12, and by this those marks 28 which are not covered.

Figure 6:
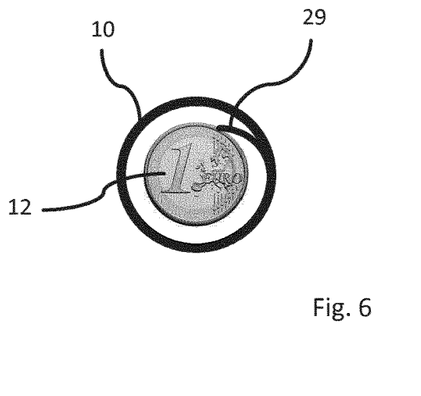

A further example relating to this is shown in FIG. 6, which corresponds to the example according to FIG. 5, except the fact that in the example of FIG. 6 a line 29 extending helically over the inner wall of the coin tube 10 is provided instead of the lines 28, which is again captured by the optical sensor 20 depending on the fill level of the coin tube 10 with coins 12.

In both examples of FIGS. 5 and 6, the spatially resolved image captured by the optical sensor 20 is again transmitted to the evaluation unit 24 via the line 22. The evaluation unit 24 determines the fill level of the coin tube 10 with coins 12 by means of the lines 28 which are not covered by the coins 12 in the example of FIG. 5 or by means of the portion of the helical line 29 not covered by the coins 12 in the example of FIG. 6. A combination of both marker types is also possible.

Figure 7:
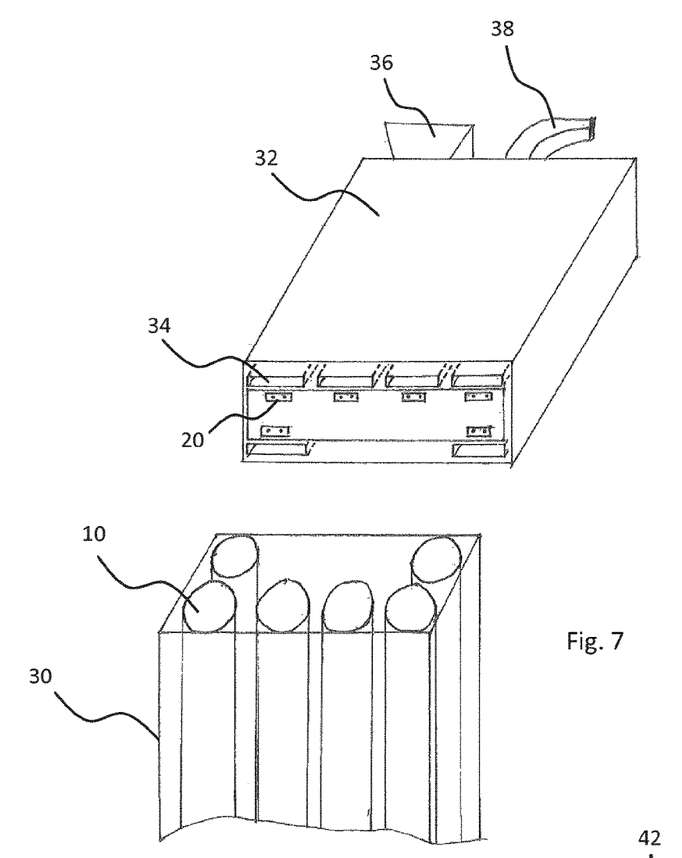

FIG. 7 shows a coin storage device according to the present invention for storing and paying out coins, a moneychanger in particular, like that used in payment stations for example. The coin storage device can be used in association with the embodiment of the device shown in the FIGS. 1 to 3, as well as in association with the embodiments of the device shown in the FIGS. 5 and 6. The coin storage device shown in FIG. 7 comprises two casing parts, which are shown in FIG. 7 in a dismounted condition for the sake of illustration. In a bottom casing part 30, six coin tubes 10 are arranged in an upright standing allotted condition. For instance, the coin tubes 10 are realized like shown in the FIG. 1 to 3 or 5 or 6 and are filled with different types of coins, only one coin type being filled into each one of the coin tubes 10 in FIG. 7 at a time, like this is shown in the FIGS. 1 to 3 or 5 and 6 by way of one coin tube 10.

Referring to FIG. 7, in an upper casing part 32 of the coin storage device there is a coin-testing device. In the operation, the casing upper part 32 is set onto the upper side of the casing part lower part 30 with its lower side that can be recognized at the front side in FIG. 7. On the lower side of the casing upper part 32, one coin slot 34 is directed towards one of the coin tubes 10 at a time. On its upper side, the casing upper part 32 has a coin inlet 36, through which coins are supplied to the coin storage device, and in particular firstly to the coin-testing device which is arranged in the casing upper part 32. The coin-testing device examines the supplied coins with respect to genuineness and coin type and guides them, depending on the type thereof, to one of the coin tubes 10 via the coin slot 34 if genuineness was proven. Thus, the coin slots 34 form sorting exits of the coin-testing device. Besides to this, at the upper side of the casing upper part 32 there is still a manually operated return lever 38, via which coins supplied to the coin-testing device can be given back, for instance in case of a coin jam.

Always neighbouring to one of the coin slots 34, there is one optical sensor 20 at a time like exemplified by means of FIGS. 1 to 3 and 5 and 6. In the condition of the casing upper part 32 as being set onto the casing lower part 30, each of the optical sensors 20 is directed towards one of the coin tubes 10 like this is exemplified in FIG. 1 for a sensor 20 and a coin tube 10. Each of the optical sensors 20 is connected to an evaluation unit 24 in this, which is arranged within the casing upper part 32 in the realization example shown in FIG. 7.

In the operation, the optical sensors 20, for instance, triggered by the evaluation unit 24, capture one spatially resolved image at a time of the coin tube 10 associated to them, which is exemplified, for instance, by way of a coin tube 10. Again, the captured images are guided to the evaluation unit 24, wherein the evaluation unit 24 determines the fill level of the respective coin tube 10 according to the invention.

Figure 8:
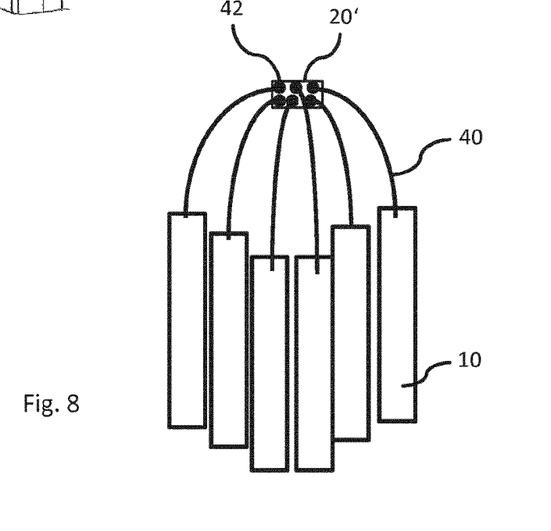

FIG. 8 shows a modified variant, like that which can be used in the coin storage device shown in FIG. 7. For the sake of illustration, the coin tubes 10 and a common optical sensor 20' associated to the coin tubes 10 are shown in FIG. 8 only very schematically. The common optical sensor 20' is optically connected to one of the coin tubes 10 via one light fibre cable 40 at a time, namely such that the optical sensor 20' captures one spatially resolved image of the upper side of the respective coin tube 10 at a time via the light fibre cable 40, like in principle shown in the FIGS. 1 to 3 or 5 and 6. In addition to this, the spatially resolved image captured via each of the light fibre cables 40 is captured by a defined partial area 42 of the overall sensor surface of the optical sensor 20'. In this way, the optical sensor 20' can capture images of all the coin tubes 10 simultaneously. Even in this variant, the optical sensor 20' is connected to the evaluation unit 24 via a line 22, and the evaluation unit 24 evaluates the images belonging to the respective coin tubes 10 in the way explained above in order to determine the fill level of the coin tube, in particular in the way explained above by means of the FIGS. 1 to 4 for the first aspect or by means of the FIGS. 5 and 6 for the second aspect of the invention. In the embodiment of FIG. 8 only one optical sensor 20' is advantageously necessary for all the coin tubes 10 of the coin storage device.

The invention claimed is:

1. A method for determining a fill level of at least one coin tube, the method comprising:
   obtaining at least one spatially resolved image of an upper side of the at least one coin tube using a spatially resolving optical sensor disposed at a defined distance to the upper side of the coin tube above the at least one coin tube; and
   transmitting the at least one spatially resolved image to an evaluation unit configured to evaluate the at least one spatially resolved image using image processing,
   wherein an inner diameter of the at least one coin tube is a diameter of an opening of the at least one coin tube and an outer diameter of the at least one coin tube is a diameter of an outer wall of the at least one coin tube, wherein a diameter ("d") of an uppermost coin in the at least one coin tube is detected in the spatially resolved image, and wherein a fill level of the at least one coin tube is determined from a ratio between i) one of the inner diameter or the outer diameter ("D") of the at least one coin tube on the spatially resolved image and ii) the detected diameter d of the uppermost coin in the at least one coin tube,
   wherein the evaluation unit is configured to detect the fill level of the at least one coin tube from a distance between the at least one spatially resolving optical sensor and the uppermost coin in the at least one coin tube, wherein the distance takes into account a defined distance according to equation:

$$a = \frac{A \cdot D}{d}$$

wherein:
      a is defined as the distance between the at least one spatially resolving optical sensor and the uppermost coin filled in the coin tube;
      A is defined as the distance between the at least one spatially resolving optical sensor and a topside of the at least one coin tube;
      d is defined as the diameter of the uppermost coin in the coin tube measured in the spatially resolved image; and
      D is defined as the inner or the outer diameter of the at least one coin tube measured in the spatially resolved image.

2. The method according to claim 1, wherein at least one of the defined distance between the at least one spatially resolving optical sensor and a topside of the at least one coin tube or the inner or the outer diameter of the at least one coin tube determined in the spatially resolved image is stored in a memory of the evaluation unit and used by the evaluating unit to determine the fill level of the at least one coin tube.

3. The method according to claim 2, wherein the at least one spatially resolved image captured by the at least one spatially resolving optical sensor comprises one of the inner diameter or the outer diameter of the at least one coin tube, and wherein the evaluation unit is configured to detect one of the inner diameter or the outer diameter of the at least one coin tube in the spatially resolved image and determine the fill level of the at least one coin tube by image processing of the at least one spatially resolved image.

4. The method according to claim 1, further comprising a fish-eye lens configured to be mounted in front of the at least one spatially resolving optical sensor.

5. The method according to claim 1, further comprising a plurality of coin tubes and one common spatially resolving optical sensor disposed a defined distance above one of the plurality of coin tubes and configured to capture and transmit at least one spatially resolved image of the upper side of the one of the plurality of coin tubes to the evaluation unit for image processing, wherein the diameter of the uppermost coin in the one of the plurality of coin tubes is determined in the spatially resolved image, and wherein the fill level of the one of the plurality of coin tubes is determined from the ratio between one of the inner diameter or the outer diameter of the one of the plurality of coin tubes in the spatially resolved image and the detected diameter of the uppermost coin in the one of the plurality of coin tubes.

6. The method according to claim 5, wherein the common spatially resolving optical sensor is optically connected to the plurality of coin tubes by a fibre optic cable.

7. The method according to claim 6, wherein the common spatially resolving optical sensor is configured to capture the spatially resolved images of the upper sides of the plurality of coin tubes simultaneously, wherein the spatially resolved images are captured on different areas of an image sensor of the spatially resolving optical sensor.

8. A method for determining a fill level of at least one coin tube having at least one mark on an inner wall, the method comprising:
   obtaining at least one spatially resolved image of an upper side of the at least one coin tube with a spatially resolving optical sensor disposed at a defined distance above the at least one coin tube and directed towards the upper side of the at least one coin tube;
   transmitting the at least one spatially resolved image to an evaluation unit; and
   evaluating the at least one spatially resolved image by image processing, wherein the at least one mark on the inner wall of the at least one coin tube is identified and used to determine a fill level of the at least one coin tube,
   wherein the evaluation unit is configured to detect the fill level of the at least one coin tube from a distance between the at least one spatially resolving optical sensor and an uppermost coin in the at least one coin tube, wherein the distance takes into account a defined distance according to equation:

$$a = \frac{A \cdot D}{d}$$

wherein:
   a is defined as the distance between the at least one spatially resolving optical sensor and the uppermost coin filled in the coin tube;
   A is defined as the distance between the at least one spatially resolving optical sensor and a topside of the at least one coin tube;
   d is defined as a diameter of the uppermost coin in the coin tube measured in the spatially resolved image; and
   D is defined as an inner or an outer diameter of the at least one coin tube measured in the spatially resolved image.

9. The method according to claim 8, wherein the at least one mark comprises a plurality of lines spaced apart along an axial direction of the at least one coin tube and extending along the axial direction on the inner wall of the at least one coin tube.

10. The method according to claim 8, wherein the at least one mark comprises at least one line extending helically along the inner wall of the at least one coin tube.

11. The method according to claim 9, further comprising a fish-eye lens configured to be mounted before the at least one spatially resolving optical sensor.

12. The method according to claim 8, further comprising a plurality of coin tubes and one common spatially resolving optical sensor disposed at a defined distance above one of the plurality of coin tubes and configured to capture at least one spatially resolved image of the upper side of the one of the plurality of coin tubes, wherein the spatially resolved images are transmitted to the evaluation unit and evaluated using image processing, and wherein the evaluating unit is configured to identify the at least one mark to determine the fill level of the at least one coin tube.

13. The method according to claim 12, wherein the common spatially resolving optical sensor is optically connected to the plurality of coin tubes by a fibre optic cable.

14. The method according to claim 13, wherein the common spatially resolving optical sensor is configured to capture the spatially resolved images of the upper sides of the associated coin tubes simultaneously, wherein the spatially resolved images are captured on different areas of an image sensor of the spatially resolving optical sensor.

15. A device for determining a fill level of at least one coin tube, the device comprising:
   at least one spatially resolving optical sensor positioned at a defined distance to an upper side of the coin tube above the at least one coin tube and configured to capture at least one spatially resolved image of the upper side of the at least one coin tube; and
   an evaluation unit coupled to the at least one spatially resolving optical sensor and configured to receive the at least one spatially resolved image, wherein an inner diameter of the at least one coin tube is a diameter of an opening of the at least one coin tube and an outer diameter of the at least one coin tube is a diameter of an outer wall of the at least one coin tube, wherein the evaluation unit is configured to evaluate the at least one spatially resolved image to detect a diameter ("d") of an uppermost coin in the at least one coin tube and determine the fill level of the at least one coin tube from a ratio between i) one of the inner or the outer diameter ("D") of the at least one coin tube on the spatially resolved image and ii) the detected diameter d of the uppermost coin in the coin tube,
   wherein the evaluation unit is configured to detect the fill level of the at least one coin tube from a distance between the at least one spatially resolving optical sensor and the uppermost coin in the at least one coin tube, wherein the distance takes into account a defined distance according to equation:

$$a = \frac{A \cdot D}{d}$$

wherein:
   a is defined as the distance between the at least one spatially resolving optical sensor and the uppermost coin filled in the coin tube;
   A is defined as the distance between the at least one spatially resolving optical sensor and a topside of the at least one coin tube;
   d is defined as the diameter of the uppermost coin in the coin tube measured in the spatially resolved image; and
   D is defined as the inner or the outer diameter of the at least one coin tube measured in the spatially resolved image.

16. The device according to claim 15, further comprising a fish-eye lens configured to be mounted before the at least one spatially resolving optical sensor.

17. The device according to claim 15, further comprising a plurality of coin tubes and one common spatially resolving optical sensor positioned a defined distance above the plurality of coin tubes and connected to the evaluation unit, wherein the evaluation unit is configured to receive spatially resolved images from the one common spatially resolving optical sensor and evaluate the spatially resolved images using image processing to determine the diameter of the uppermost coin in a respective coin tube, and wherein the evaluation unit is further configured to determine the fill level of the respective coin tube using the ratio between one of the inner diameter or the outer diameter of the respective coin tube in the spatially resolved image and the detected diameter of the uppermost coin in the respective coin tube.

18. The device according to claim 17, wherein the common spatially resolving optical sensor is optically connected to the plurality of coin tubes by a fibre optic cable.

19. The device according to claim 18, wherein the spatially resolved images are captured in different areas of the common spatially resolving optical sensor.

* * * * *